United States Patent [19]
DeLuca et al.

[11] Patent Number: 4,860,003
[45] Date of Patent: Aug. 22, 1989

[54] COMMUNICATION SYSTEM HAVING A PACKET STRUCTURE FIELD

[75] Inventors: Joan S. DeLuca; Michael J. DeLuca, both of Boca Raton; George B. Shea, Lake Worth, all of Fla.

[73] Assignee: Motorola, Inc., Schaumburg, Ill.

[21] Appl. No.: 199,732

[22] Filed: May 27, 1988

[51] Int. Cl.$^4$ .............................................. H04Q 7/00
[52] U.S. Cl. .............................. 340/825.440; 370/93; 370/94; 340/825.47; 340/825.48; 340/825.52
[58] Field of Search ............................. 370/93, 94, 95; 340/825.52, 825.48, 825.47, 825.44

[56] References Cited

U.S. PATENT DOCUMENTS

| | | | |
|---|---|---|---|
| 4,369,443 | 1/1983 | Giallanza et al. | 340/825.44 |
| 4,424,514 | 1/1984 | Fennell | 340/825.52 |
| 4,427,980 | 1/1984 | Fennell et al. | 340/825.52 |
| 4,437,095 | 3/1984 | Akahori et al. | 340/825.44 |
| 4,518,961 | 5/1985 | Davis et al. | 340/825.44 |
| 4,641,304 | 2/1987 | Raychaudhuri | 370/95 |
| 4,668,949 | 5/1987 | Akahori et al. | 340/825.48 |

Primary Examiner—Donald J. Yusko
Assistant Examiner—Eric O. Pudpud
Attorney, Agent, or Firm—Michael J. DeLuca; Vincent B. Ingrassia

[57] ABSTRACT

A communication system develops an information packet having a packet structure field and at least one message. The message has an address and information associated with the address. A central station accumulates and incorporates the at least one message into the information packet. The central station determines the occurrence of the at least one address and generates identifying data indicating where the address occurs within the information packet. The identifying data is incorporated into the packet structure field and the information packet is transmitted. The information packet is received by at least one selective call receiver capable of operating in a high power mode in order to receive the information packet and a low power mode when receiving is not being performed. The selective call receiver extracts the packet structure field and interprets the identifying data. The identifying data is used to operate the selective call receiver in the high power mode only during the occurrence of the at least one address. The selective call receiver operates in the low power mode for the remainder of the information packet unless the information associated with the address is intended to be received by the selective call receiver.

39 Claims, 13 Drawing Sheets

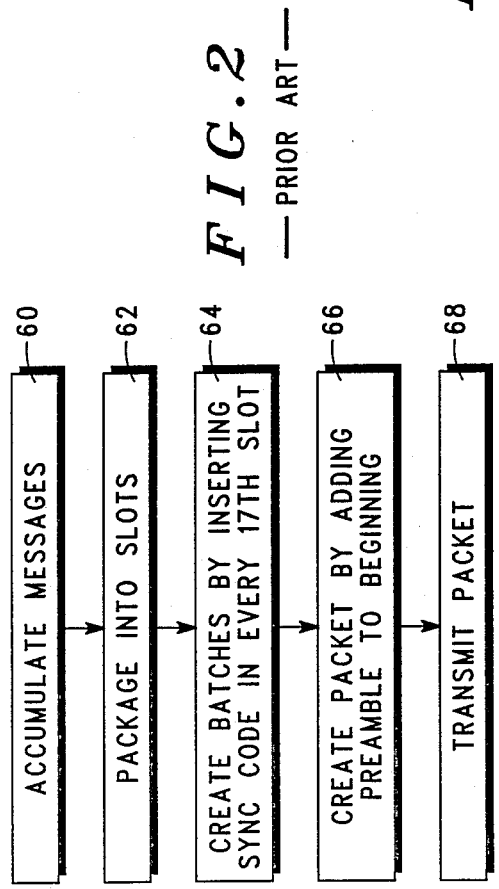
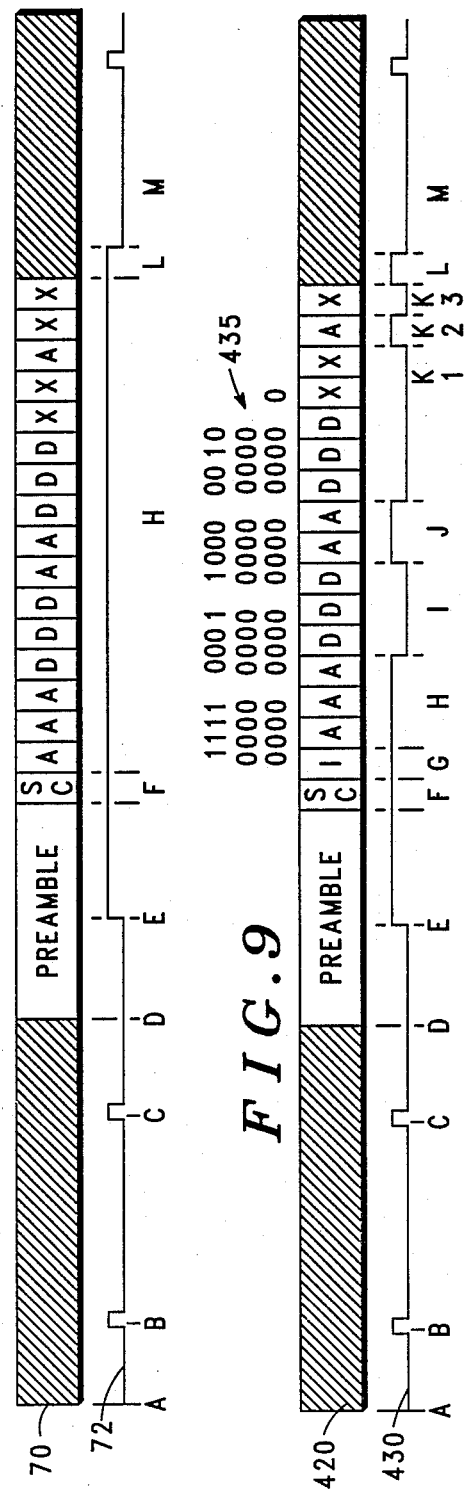
FIG. 2 — PRIOR ART —
FIG. 3 — PRIOR ART —
FIG. 9

FIG. 10
FIG. 11
FIG. 12

COMMUNICATION SYSTEM HAVING A PACKET STRUCTURE FIELD

BACKGROUND OF THE INVENTION

Prior art selective call message handling systems generally accumulated messages at a central station also referred to as a paging terminal, and transmitted the messages to a selected group of selective call receivers also referred to as pagers. Such a system may use the Golay Sequential Code (GSC) which is well known to those familiar with the art. The operation of the GSC system has been described in detail in U.S. Pat. No. 4,424,514 to Fennell et al. entitled "Decoder for Transmitted Message Activation Code" and U.S. Pat. No. 4,427,980 to Fennell et al. entitled "Encoder for Transmitted Message Activation Code".

A brief description of the tone only, numeric, and alphanumeric messaging aspects of GSC is presented herein. The paging terminal accumulates messages for a group of pagers. The messages are then structured into a GSC packet and transmitted.

FIG. 1 shows the prior art packet structure 20 of the Golay sequential system. A packet has a preamble 22 followed an at least one batch 24 of information. Preamble 22 has a 1.4266 second duration. The preamble format starts with 28 bits of comma 26 at 600 bits per second (bps) followed by eighteen transmission of a preamble word 28. Comma is an alternating 1-0 pattern. A preamble word 28 is a 23,12 BCH code and is transmitted at 300 bps. The eighteen preamble words are identical and are a predetermined code word used for selecting a group of pagers.

The preamble is followed by at least one batch 24 of signals, each batch starts with a sync code 30 and is followed by 16 slots 32 of information. A batch transmission has a 3.42833 second duration. The sync code 30 at the beginning of the batch has a 0.20166 second duration. The sync code 30 starts with 28 bits of comma 34 at 600 bps and is followed by a predetermined 23,12 code word 36 at 300 bps which is followed by one comma bit 38 at 600 bps, and ends with a second predetermined 23,12 word 40 at 300 bps. The sync code 30 indicates the start of a batch.

The 16 slots 32 which follow the sync code may have address or activation codes 42 or may have information 52. When a slot has an address or activation code, the format of the slot is similar to the format of the sync code 30 wherein the slot begins with 28 bits of comma 44 at 600 bps, followed by a 23,12 word 46 at 300 bps, followed by one comma bit 48 at 600 bps, and then followed by a second 23,12 268 word at 300 bps. Note that addresses and the activation code are similar in structure both having two 23,12 words. For the activation code, the two 23,12 words 46 and 50 are predetermined. For addresses, the two 23,12 words 46 and 50 may be one of a plurality of words allowing for a multitude of addresses. During an address decode, the pager searches for a match of both the first word 46 and the second word 50 with a unique first and second word assigned to a pager.

A slot may also have data information 52, a data information slot starts with a comma bit 272 transmitted at 600 bps, followed by eight 15,7 words 54 and 56 transmitted at 600 bps. A 15,7 word is a coded word having 15 total bits of which 7 bits are information bits. The remaining 6 bits are parity based upon the 7 information words and may be used for error detection or correction. The eight 15,7 words are structured into seven information words 54 followed by a check word 56. The seven information words 54 form a block of 49 information bits. A block of information is structured to have 48 bits used for pager information and the 49th bit is used as a continue bit. The continue bit indicates that the subsequent slot has additional information.

In a typical application, a preamble is followed by at least one batch, a batch beginning with a sync code and followed by 16 slots. If a slot has a tone only address or group information, the subsequent slot may have an address or additional group information. If a slot has a numeric or alphanumeric address, the subsequent slot has data information associated with the address. The tone only address or the combination of a numeric or alphanumeric address with data comprises a message for a pager.

FIG. 2 shows a prior art paging terminal operation. The prior art paging terminal's first function is to accumulate messages for a group of pagers, step 60. The messages are then packaged into slots, step 62, either address or information or activation codes, the packaging being detailed in FIG. 1. Batches are then created by inserting a sync code in every 17th slot, step 64. A packet is then created by adding a preamble particular to a group of pagers at the beginning, step 66. The packet is then transmitted in step 68.

FIG. 3 refers to prior art battery saving operation for a single batch packet, the packet being created by a paging terminal operating in accordance with the prior art flow chart of FIG. 2. Line 70 indicates the signal which is transmitted by the base station and received by the selective call receiver. The shaded area indicates that nothing is transmitted by the paging terminal and noise is received by the pager. The packet begins with a preamble signal labelled PREAMBLE followed by a sync code which is illustrated by the letters SC in a box. After the sync code, 16 boxes corresponding to the 16 slots of FIG. 1. Inside each of the boxes is a letter A, D, or X. The letter A corresponds to an address for a selective call receiver. The letter D corresponds to data, the data being associated with a preceding address and the address and data making up a message for a selective call receiver. The letter X corresponds to a slot which has no message information. X may be transmitted when a portion of the packet information is complete and no additional information is left to transmit to the selective call receivers. X may be an idle code address reserved for filling the remainder of a batch.

Line 72 indicates the battery saver operation of the prior art pager during signal 70. Beginning at event A, line 70 shows a shaded area which corresponds to noise indicating no transmission. In the noise environment line 72, events B and C show the pager being periodically activated during the search for a preamble. The pager is active while line 72 is high and battery saving while line 72 is low. An active pager indicates a pager that is consuming electrical energy. In the active state, the receiver is powered on and demodulating the transmitted signal while the decoder is analyzing and processing the demodulated signal. In the battery saving mode, the receiver and decoder operate in a reduced power mode.

For events B and C, the pager is active long enough to detect at least one preamble word. In the event a preamble word is not detected, the pager returns to battery saver mode.

At event D, the base station begins a packet transmission. The packet transmission begins with a preamble. At event E, the pager is active and finds a preamble word. Upon finding a preamble word, a search for a sync code begins. Sync is found at event F. Upon finding sync code, the batch decoding begins. Decoding of the batch, event H, is well known to those familiar with the art. At event L, the batch is terminated and the RF signal is again noise as indicated by the shaded area of line 70. During event L, the pager searches for a subsequent sync code which, if received, indicates a subsequent batch will be transmitted. Upon finding no sync code, the pager reverts to a preamble search battery saver operation.

Note that the prior art pager is active for the entire duration of the packet. Typically, an address search is performed during slots when addresses or data is transmitted and during slots when idle code may be transmitted as indicated by the letter X. The prior art pager terminates the packet upon searching for a sync code. The presence of a sync code indicates the start of a subsequent batch in the packet and the absence of a sync code indicates the end of the batch. Upon detecting the absence of the sync code, the pager reverts back to a preamble search mode.

The packet indicated in FIG. 3 has four tone only messages and two numeric or alphanumeric messages. A slot with an address followed by a slot comprising another address or an idle code word can indicate a tone only address. The two messages with numeric or alphanumeric type data are indicated by addresses followed by subsequent data slots. In each case, there is an address followed by three data blocks which corresponds to a message for a selective call receiver. A prior art pager that has not detected its own address decodes a data slot as an address. The data slot is structured in such a manner so as to inhibit the detection of an address during a data slot transmission. However, the pager searching for an address while data is being transmitted unnecessarily expends electrical energy during the search for an address.

FIG. 4 is a flow chart showing the operation of a prior art pager. Prior art pager battery saver operation is shown in FIG. 3. The operations may be executed by a program operating within a paging decoder. The program starts at step 102 wherein power on initialization functions are performed. Such functions are well known to those familiar with the art. The program proceeds to step 104 to activate the receiver during which time the receiver is powered on and transmitted signals are demodulated and processed. The program proceeds to step 106 to search for preamble for about 0.15 seconds. During this time, the receiver is activated for about 0.15 seconds and the decoder activate searches for a preamble signal. If preamble is not found, the pager proceeds to step 108 to turn the receiver off and to perform battery saving for about 1.30 seconds. After completion of step 108, the program returns back to step 104 to turn the receiver on. Steps 104–108 incorporate the steps performed during the preamble search operation of the pager.

If in step 106 the preamble was found, the program proceeds to step 110 to check for a sync code. The sync code is searched for about 1.45 seconds. If sync code is not found within about 1.45 seconds, the program returns to step 108 to turn the receiver off and then to reenter the preamble search mode. If in step 110 a sync code is found, the program proceeds to step 128 to initialize for the first slot in a batch. The pager then decodes the slot in step 122.

The program proceeds to step 118 to check if a pager address is found. If in step 118 a pager's address is not found, the program proceeds to check if 16 slots have elapsed, step 120. If 16 slots have not elapsed, the program returns to step 122 to decode the next slot. Steps 118, 120, and 122 are performed for the 16 slots within a batch. Upon the end of the 16th slot, step 120 proceeds to step 124 to decode the next slot and then in step 126 to check for a sync code. If a sync code is found, a subsequent batch is appended to the packet and the program returns to step 128 to reinitialize for the first slot in the subsequent batch. After completion of step 128, the program proceeds through steps 118–122 to decode the information within the subsequent batch. If in step 126 the sync code is not found, the program returns to step 108 to turn the receiver off and to begin the preamble search.

Referring back to step 118, if a pager address is found, the program checks if the address is alphanumeric or a tone only. The response to a tone only address is well known to those familiar with the art and is not detailed in this flow chart. However, upon reception of a tone only address, the pager invokes a tone only alert function and then proceeds to step 120 to continue searching for addresses. If the address in step 618 is an alphanumeric or numeric address, the program proceeds to step 130 to check if 16 slots have elapsed. If 16 slots have not elapsed, the program proceeds to step 132 to decode the next slot and handle the message within. The program then proceeds to step 134 to check if two consecutive slots were in error. The slot error determination is made by testing, in a manner known to those familiar using the art, the check sum word 56 of FIG. 1 with the information words 54 of FIG. 1. If the test is successful, the slot is not in error, otherwise the slot is errored. If two consecutive slots are not in error, the program proceeds to step 136 to check for the end of the message. The end of a message is indicated by a predetermined character within an information word. If the message has not been ended, the program returns to step 130 to check if 16 slots have elapsed. The elapsing of 16 slots indicates the completion of a batch. Upon the completion of a batch, the program proceeds to step 138 to decode the sync code next slot. If the sync code was found, the packet has a subsequent batch and the program proceeds to step 142 to initialize for the first slot in the batch. The program returns to the message decoding of step 132. However, if the sync code was not found, the slot is flagged as an errored slot, and the evaluation will be considered in step 134. The program then proceeds to step 142.

In the event the user of the pager travels into an area where the RF signal grows weak, the information slots within the message may become corrupted by noise. If there are two consecutive slots corrupt within the message, step 134 returns to step 108 to being a preamble search. On the other hand, if all of the data associated with the message is decoded, an end-of-message character is encountered. Upon encountering an end-of-message character, step 136 returns the program to step 120 which puts the pager back into an address decoding mode.

In portable selective call receivers, it is desirable to achieve a maximum battery life. A way to achieve improved battery life is to prohibit a pager from expending electrical energy searching for an address while data is being transmitted within a packet. Thus, it is desirable to transmit packet structure information within the packet indicating the locations of addresses as well as other group information within the packet. Group information, which is also referred to as other information, is information to be received by a plurality of selective call receivers and includes activation codes and packet structure information. Pagers may then use the packet structure information to expend electrical energy searching for their address or group information only at the time of an address or group information transmission and perform battery saving at the time of subsequent data transmissions, unless, of course, the data is transmitted to a particular selective call receiver.

It is desirable to implement a pager being compatible with the existing GSC transmission technique, allowing the addition of the structure information within the packet to be transmitted and decoded by pagers capable of interpreting the structure information without interfering with the operation of prior art GSC pagers not capable of interpreting the structure information. It is also desirable for the pagers to be capable of decoding and handling the new structure information to operate on existing GSC paging terminals that do not transmit structure information within the message packet. In such a case, the improved battery saver detailed by the present invention would not be realized.

It is also desirable to have a paging terminal capable of accumulating messages into a packet. The paging terminal then determines the location of addresses and group information within the packet, generates the packet structure information and inserts the packet structure information within the packet. The paging terminal then transmits the packet to the pagers.

SUMMARY OF THE INVENTION

In general, an apparatus and method for a communication system effects communications from a central station to at least one selective call receiver, produces an information packet having at least a first portion and a packet structure field. The information packet further includes a message having an address and information associated with the address. The packet structure field further includes an identifying means for identifying the occurrence of the address within a range of the information packet. The central station accumulates the message for the selective call receiver for a portion of the information packet and positions the packet structure field and the accumulation within the portion of the information packet. The central station then determines the location of addresses within the portion of information packet and generates the identifying means to correspond to the location determination. Finally, the central station incorporates the identifying means within the positioning of packet structure field and transmits the information packet.

The apparatus and method of the present invention further relate to reducing power consumption of the selective call receiver. The selective call receiver is capable of operating in a low power mode and a high power mode and has a unique address for identifying the selective call receiver. The selective call receiver operates in the high power mode during reception of the information packet in order to extract the packet structure field and interpret the identifying means within the packet structure field to determine the occurrence of the address within the information packet. The receiver then switches to the low power mode until the occurrence of the address. When the address occurs, the receiver is powered up into the high power mode to decode the address. Additionally, the selective call receiver may be a member of a plurality of selective call receivers, each selective call receiver capable of receiving the information packet.

BRIEF DESCRIPTION OF THE DRAWINGS

FIG. 2 shows a prior art paging terminal operation.

FIG. 3 shows a prior art battery saver operation on a single batch packet.

FIG. 9 shows battery saver operation in accordance with the present invention on a single batch packet FIG. 10 shows battery saver operation in accordance with the present invention on a multiple batch packet.

FIG. 11 shows battery saver operation in accordance with an alternate implementation of the present invention on a multiple batch packet.

FIG. 12 shows battery saver operation in accordance with a second alternate implementation of the present invention on a multiple batch packet.

DESCRIPTION OF A PREFERRED EMBODIMENT

Figure 5:
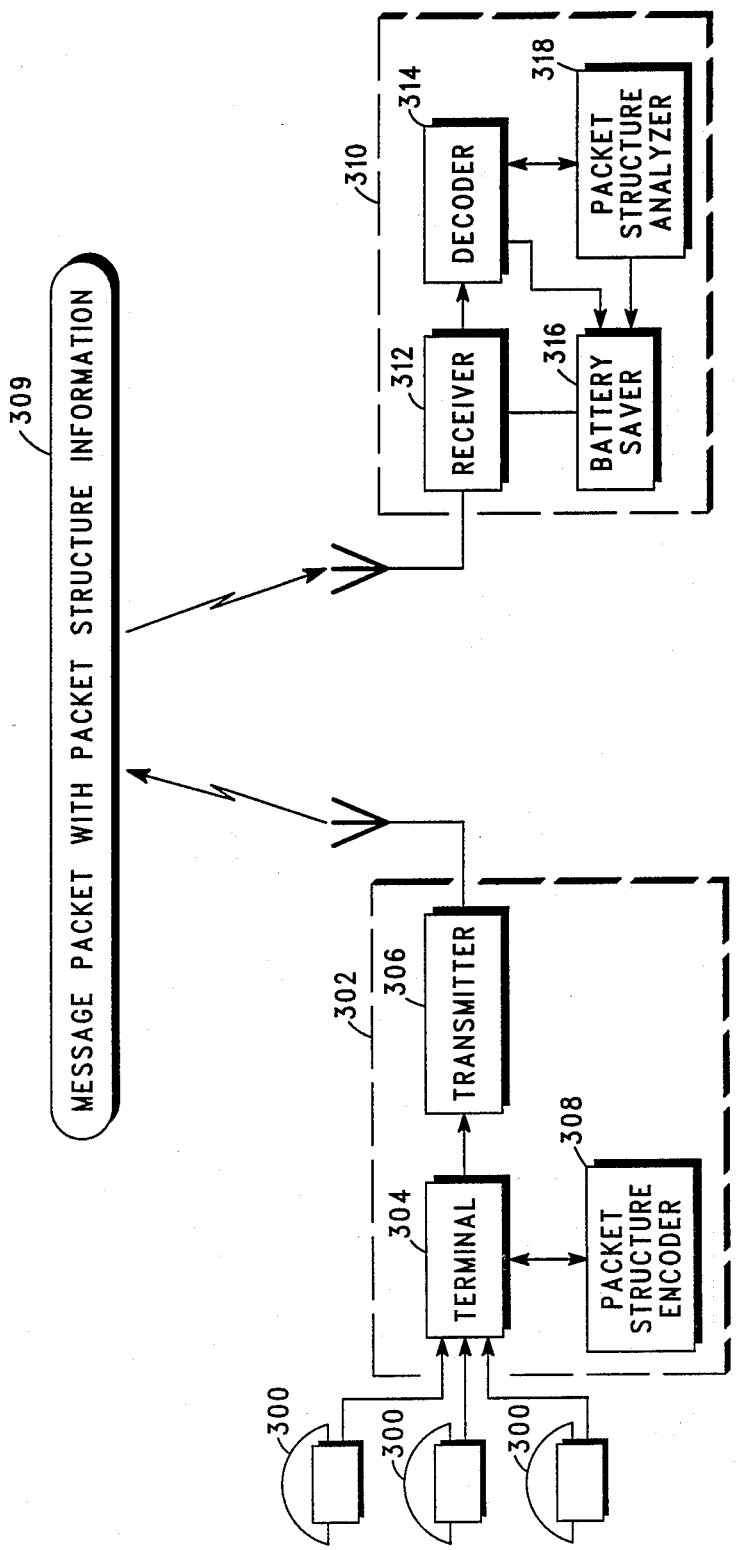
FIG. 5 shows a paging system in accordance with the present invention.

FIG. 5 shows a paging system in accordance with the present invention. A message for a selective call receiver originates on one of a plurality of telephones 300 connected to a central station 302 through the telephone network. Central station 302 has a paging terminal 304. Paging terminal 304 is well known to those familiar with the art and may be a Modax 1000 paging terminal manufactured by Motorola, Inc. Paging terminal 304 accumulates messages for a group of pagers. Packet structure encoder 306 then analyzes the messages and determines which of the slots in the packet include address or group information and which do not. The packet structure encoder then inserts the structure information indicating the location of the addresses and group information within the packet. The functions of paging terminal 304 may include the function of the packet structure encoder 306. A preamble signal is added and the packet is then transmitted by paging transmitter 308 including packet structure information.

Message packet 309 is then received by a selective call receiver or pager 310. In general, the operation of the pager is known to those familiar with the art and may be a PMR 2000 pager manufactured by Motorola, Inc. The pager includes a receiver 312 for demodulating the RF modulated packet. The packet is then decoded by decoder 314. The decoder may comprise a microcomputer controller such as an MC68HC05C8 microcomputer manufactured by Motorola, Inc. The general operation of such a decoder is known to those familiar with the art and such decoders are widely used.

Prior to decoding the packet, the decoder commands battery saver 316 to periodically supply power to receiver 312 in the search for the packet. Upon finding the packet's preamble, decoder 314 decodes the packet. Packet structure analyzer 318 then operates battery saver 316 during the reception of the packet based upon the packet structure information within the packet.

Figure 6:
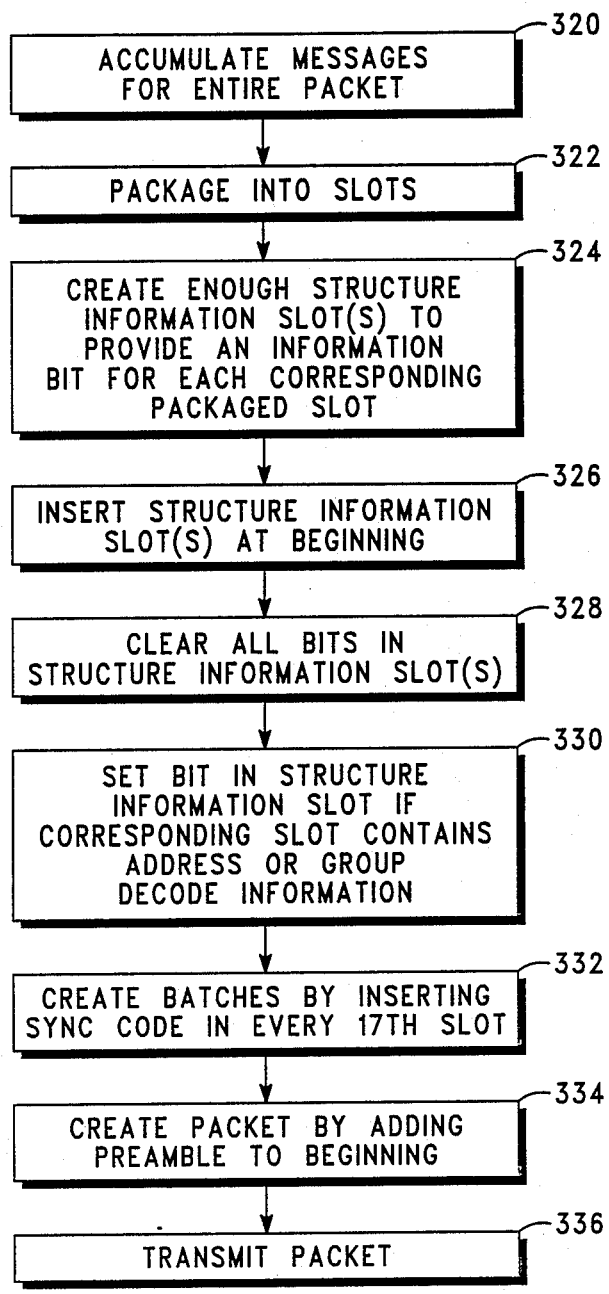
FIG. 6 shows the paging terminal operation in accordance with the present invention.

FIG. 6 shows a paging terminal operation in accordance with the present invention. First, messages are accumulated in step 320 and packaged into slots, step 322. Next, in step 324, structure information slots are created to provide a structure information bit corresponding to each slot from step 322, thereby providing for an identifying means for indicating the location of addresses and other information within the packet. Since an information slot has 48 information bits, a message packet having 48 or less total slots will only require one information slot for the entire packet to be within the range of the identifying means. However, a message packet having between 49 and 96 slots will require two structure information slots to be within the range of the identifying means and so forth. The program then proceeds to step 326 to insert the structure information slots at the beginning of the packet. In step 328, all the bits in the information slots are cleared. In step 330, bits in the structure information slot are set if a corresponding slot in the packet has address or group information, thereby leaving all remaining bits clear. The program then proceeds to step 332 to create batches by inserting sync codes in every 17th slot. A packet is created by adding a preamble to the beginning, step 334, and then the packet is transmitted, step 336.

Figure 1:
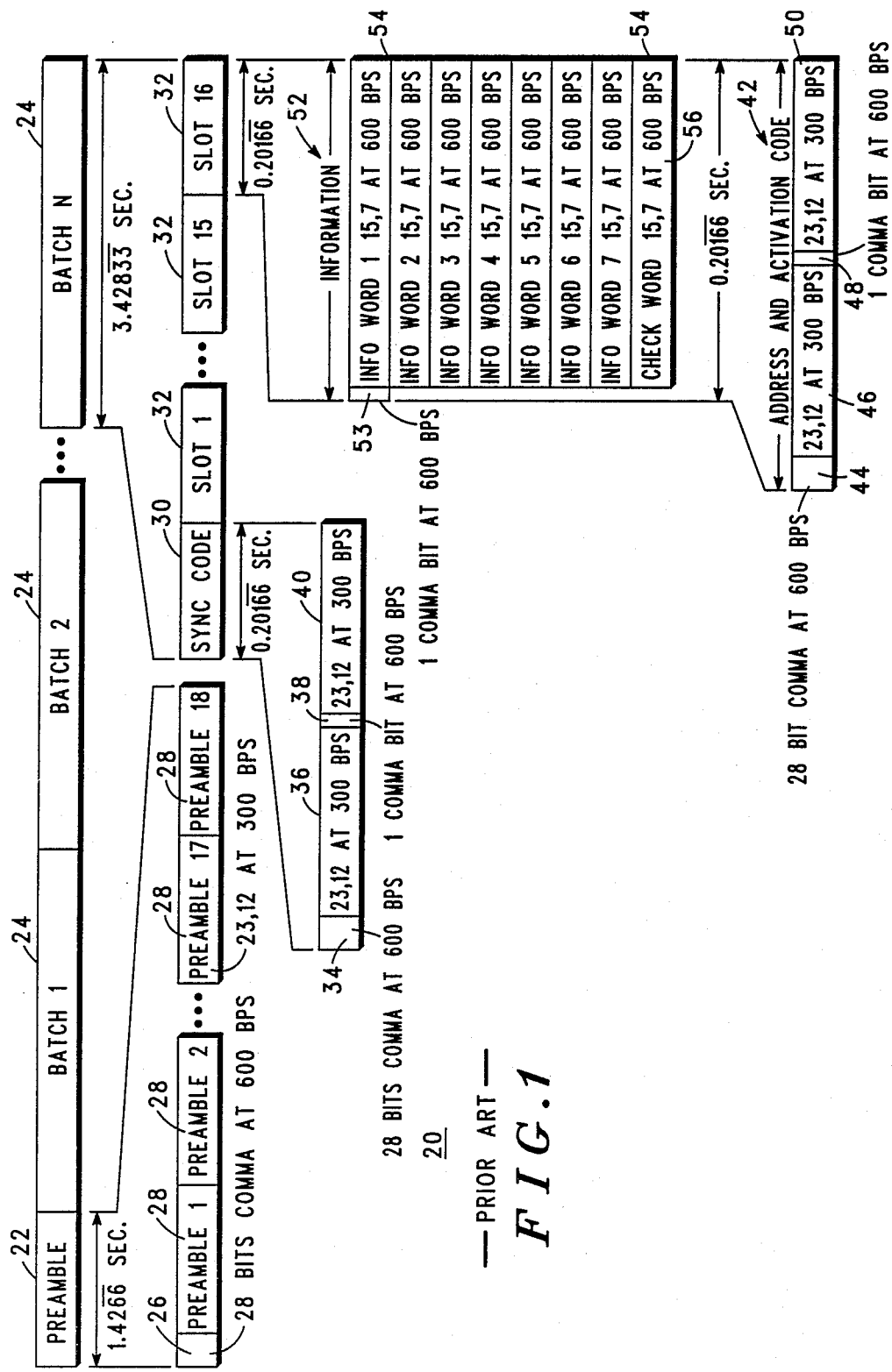
FIG. 1 shows a prior art packet structure of the GSC system.

The paging base station operating in accordance with FIG. 6 is required to accumulate all the messages for an entire packet prior to creating the structure information. This implies certain queuing issues within the paging terminal. The paging terminal is required to store and buffer a large amount of data for a message packet. In an alternate mode of the present invention, it is desirable for the paging terminal to accumulate enough messages to form a partial packet and then transmit the partial packet while additional messages continue to be accumulated from the telephone inputs for a subsequent partial packet. A partial packet may, for example, comprise three batches. Referring back to FIG. 1, one batch lasting 3.4283 seconds would result in a three-batch partial packet lasting over 10 seconds. During this 10 seconds, additional information for a subsequent packet may be stored within the terminal while the first partial packet is being transmitted. A plurality of partial packets contiguously transmitted form a complete packet.

Figure 7A:
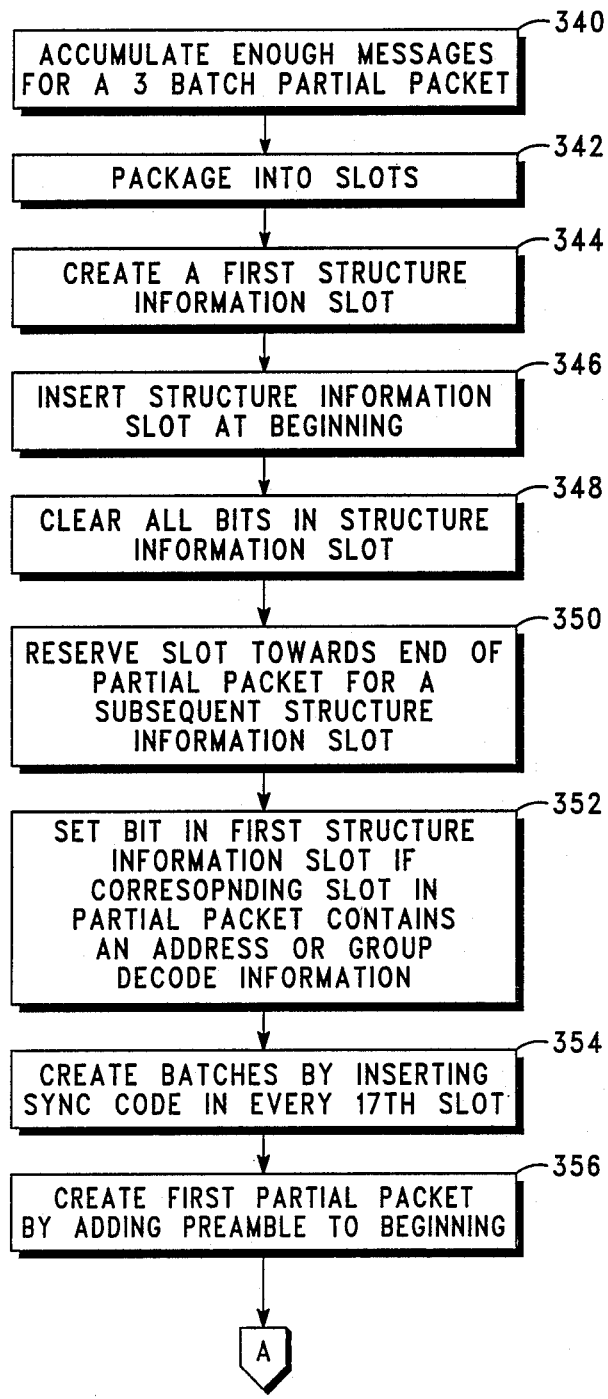
FIG. 7A-7B shows an alternate paging terminal operation in accordance with the present invention.
Figure 7B:
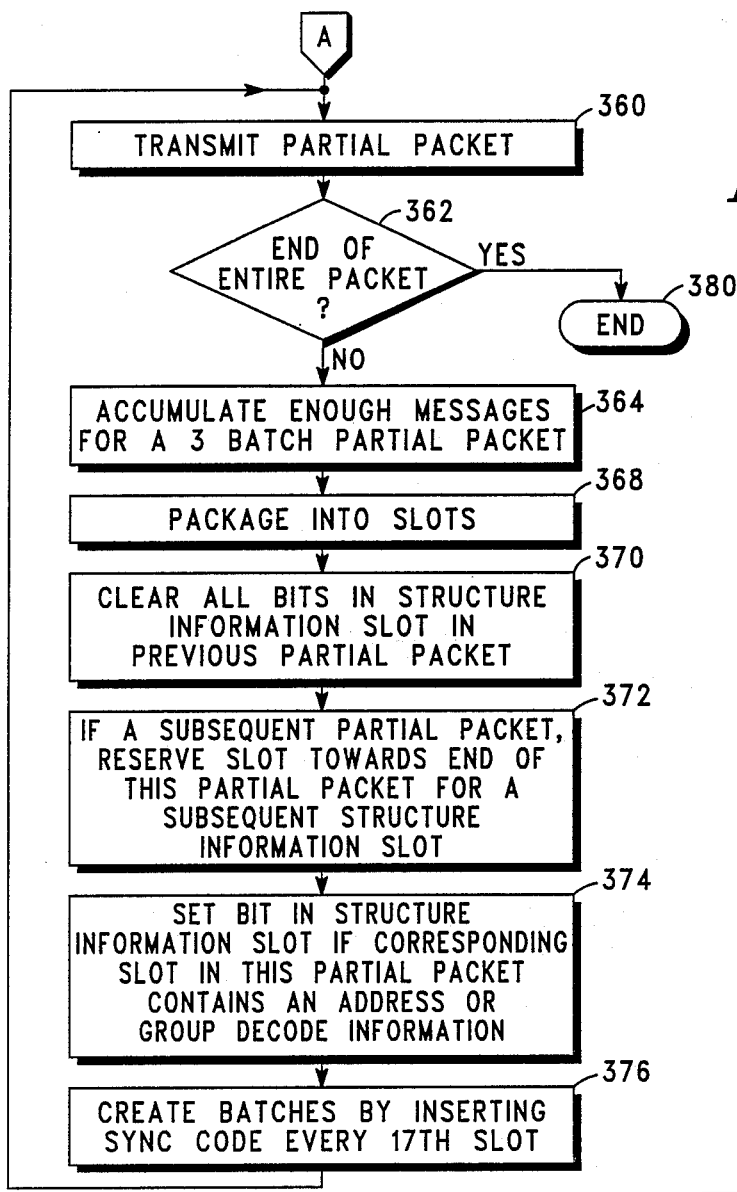

FIG. 7 shows an alternate embodiment for the paging terminal's operation for transmission of a packet wherein the packet is made up of a plurality of partial packets. First, in step 340, enough messages are accumulated for a three-batch partial packet. The partial packet is then packaged into slots at step 342. A first structure information slot is created at step 344 and the first structure information slot is inserted at the beginning of the partial packet in step 346. In step 348, all the bits in the structure information slot are cleared. Step 350 reserves a slot towards the end of the partial package for a subsequent structure information slot. The subsequent structure information slot is not created until enough messages have been accumulated for the subsequent partial packet. Next, in step 352, bits are set in the first structure information slot if the corresponding slot in the first partial packet has address or group decode information. Then in step 354, batches are created by inserting a sync code in every 17th slot. The first partial packet is created by adding a preamble to the beginning in step 356. Then in step 360, the partial packet is transmitted. Step 362 checks if the entire packet is to be ended. If the packet is not to be ended, step 364 accumulates enough message for a subsequent three-batch partial packet. The accumulation occurring in step 364 occurs simultaneously with the transmission of step 360. Then in step 368, the partial packet is packaged into slots. Next in step 370, all the bits in the structure information slot in the previous partial packet are cleared. In step 372, a slot is reserved towards the end of this partial packet for a subsequent structure information slot only if a subsequent partial packet is to be transmitted. Then in step 374, bits are set in this structure information slot if the corresponding slot in this partial packet has an address or group decode information. It should be noted that steps 364-374 must be completed prior to the transmission of the slot reserved for the structure information word for the present partial packet accumulated in 364 prior to the transmission of the partial packet slot for the structure information word created from a previous operation of step 350 or step 372. Having done so, step 376 creates batches by inserting sync code in every 17th slot. Returning back to step 360, the partial packet is transmitted. Steps 360-376 are repeated for the number of partial packets required to complete the entire packet transmission, upon which time step 362 proceeds to step 380 indicating the end of the entire packet.

The alternate embodiment of FIG. 7 allows the paging terminal to accumulate a part of the packet and then create a structure information word indicating the structure of that part of the packet and then transmits that part of the packet. This has the benefit of reducing the amount of message accumulation and storage required by eliminating the necessity to accumulate an entire packet of information prior to transmission. It should be appreciated that a partial packet size of three batches is an arbitrary amount, and the partial packet accumulation may be made greater by using a multiple of structure information slots with each partial packet. A three-batch partial packet is convenient because each structure information slot has enough structure information bits to indicate the structure of a three-batch partial packet. Similarly, a partial packet having two structure information slots could be as long as six batches.

It can be appreciated that the packet of FIGS. 6 and 7 as transmitted includes a preamble followed by at least one batch, the batch starting with a sync code and followed by at least one structure information slot in a predetermined location, the predetermined location being the first slot in the batch and the structure information slot being identical in format to a data slot. However, since this structure information slot is not dedicated to an address, the information is not directed to any particular selective call receiver. The structure information slot, however, has information pertinent information to the structure of the batch transmission information and the bit being cleared if the slot in the packet does not have address or group decode information. The pager battery saver should be operated for slots where the corresponding bit in the structure information word is clear, thereby conserving electrical energy. The receiver should be on and the pager decoding during slots in the packet where the corresponding structure information bit is set, thereby decoding address or group information. Of course, the receiver would remain on to decode the message if its selective call address was decoded.

FIGS. 6 and 7 show techniques for transmitting packet structure information within a packet wherein the packet structure information is at least first incorporated within a predetermined location within the packet. In some instances, it may be desirable to supply packet structure information anywhere within the transmission of a packet. In doing so, battery saver would be performed in parts of the packet where packet structure information is not provided and battery saving in accordance with the present invention would be performed for the range in which packet structure information is supplied. Such a technique would be an alternate technique for operating a paging terminal in accordance with the present invention.

Figure 8A:
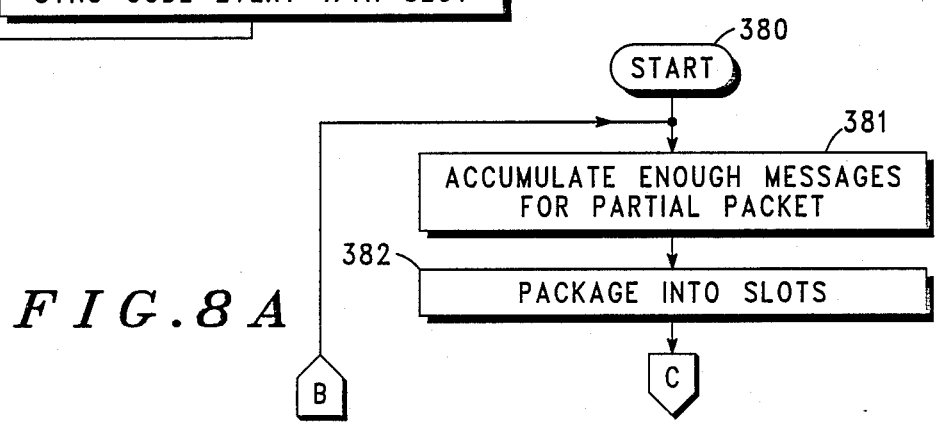
FIG. 8A-8B shows a second alternate paging terminal operation accordance with the present invention.
Figure 8B:
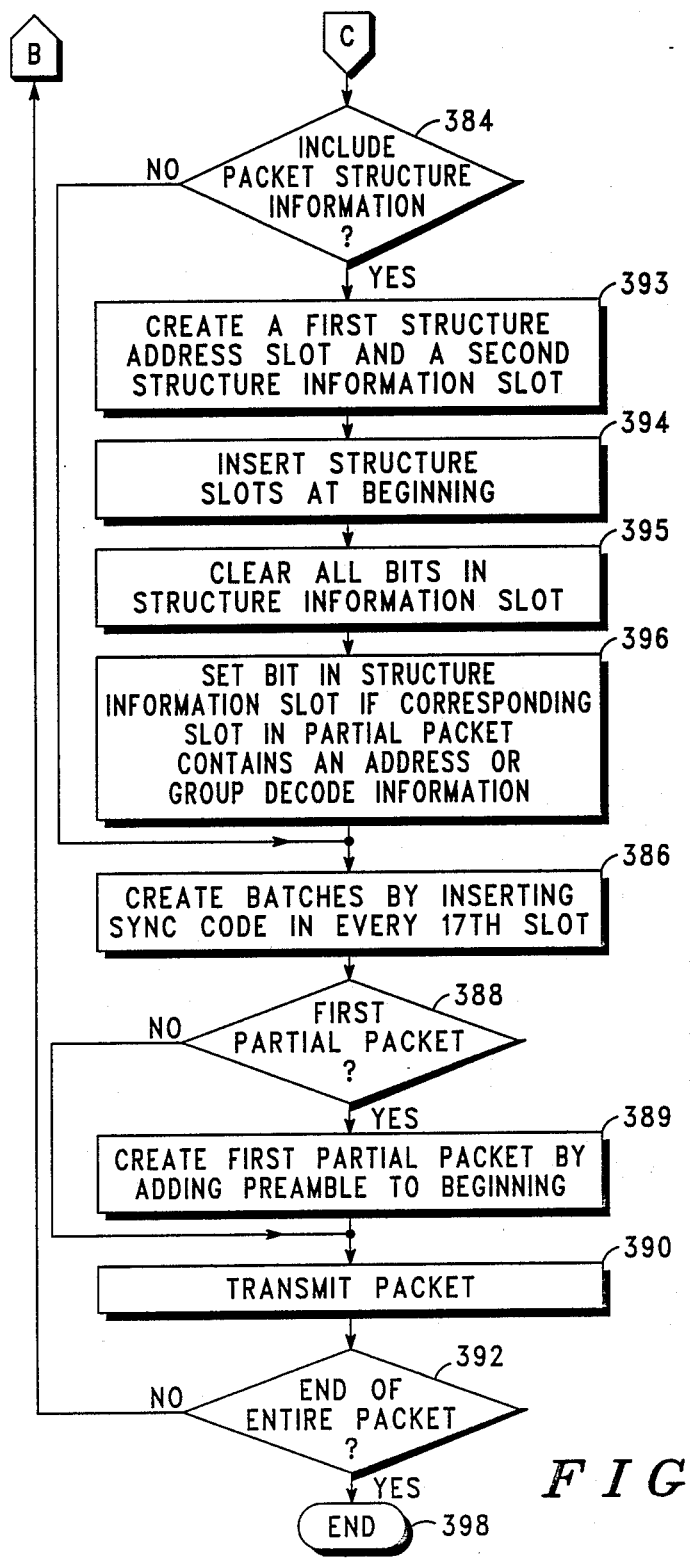

FIG. 8 shows another alternate embodiment for the paging terminal's operation in accordance with the present invention. Referring to FIG. 8, the paging terminal begins with the start operation, step 380, and proceeds to accumulate enough messages for a partial packet, step 381, and then package the information into slots, step 382. Next, in step 384, the terminal determines if packet structure information should be included with the accumulated messages. If the packet structure information is not to be included with this partial packet accumulation, the program proceeds to step 386 to create batches by inserting sync code into every 17th slot. The program then proceeds to step 388 to check if this is a first partial packet transmission. Being that this is a first partial package transmission, the terminal proceeds to step 389 to create a first partial packet by adding a preamble signal to the beginning. The program then proceeds to step 390 to transmit the partial packet. Next, in step 392, the end of the packet is checked for. If in step 392 the packet is not to be ended, the program returns to step 381 to accumulate messages for a partial packet and then to package the accumulation into slots, step 382. If in step 384 packet structure information is to be included, the terminal proceeds to step 393 to create a first structure address slot and a second structure information slot in order to form an identifying means. Then in step 394, the structure information slot is inserted at the beginning of the partial packet, thereby positioning the identifying means. The structure address is a predetermined address used in accordance with the present invention to indicate that the information to follow is information pertaining to the structure of the subsequent partial packet. The terminal then proceeds to step 395 to clear all bits in the structure information slot. Next, in step 396, a bit is set in the structure information slot if the corresponding slot in the partial packet has an address or group decode information, thereby generating the contents of the identifying means. The program then returns to step 386 to create batches by inserting sync code in every 17th slot. In step 388, the first partial packet is checked for. If it is not a first partial packet, the program proceeds to step 390 to transmit the partial packet and then to step 392 to check for the end of the entire packet. The aforementioned steps are repeated until an entire packet is transmitted. Then, in step 392, when an entire packet is transmitted, the program proceeds to step 398 to end this operation.

The terminal operating in accordance with FIG. 8 is not required to place a first structure information slot in a predetermined location after the first sync code of the packet. The structure information slot may occur anywhere within the packet and is preceded by a predetermined address reserved to indicate that the subsequent information associated with the address is packet structure information. The packet structure information occurring after the address is structured in a like manner to the packet structure information words of FIGS. 6 and 7. The structure information slot has information pertinent to the structure of the packet transmission wherein each information bit of the structure information slot corresponds to a slot in the subsequent partial packet, the bit being set if the slot has an address of group decode information and the bit being cleared if the slot in the packet does not have address of group decode information.

It should be appreciated that the step of creating a batch is referred to in FIG. 2 as step 64 and FIG. 6 as step 332 and FIG. 7 as steps 354 and 376 and FIG. 8 as step 386 may include filling the unused portion of a batch with idle code addresses. An idle code address is a predetermined address reserved by the system for filling slots within a batch that have no correspondence to accumulated messages. It should be further appreciated that the structure address of step 393 in FIG. 8 may be identical to the idle code address. Since prior art pagers are not programmed to respond to an idle code address, defining an idle code address as a structure address and following the idle code address with structure information would only be interpreted by pagers programmed to interpret an idle code address in such a manner. Idle code addresses followed by a subsequent idle code address would be interpreted as purely an idle code address and not a structure information address. Adapting this technique for a structure code address has the further advantage of not removing an additional address from the address set available for selective call paging.

FIG. 9 shows the battery saver operation in accordance with the present invention on a single batch packet. Line 420 corresponds to the signal transmitted by the base station and received by the pager and has a correspondence to line 70 of FIG. 3. Line 430 is an illustration of the pager of the present invention's battery saver operation on the packet structure in accordance with the present invention. At interval A, no information is being transmitted as indicated by the shaded area of line 420. The pager performs a preamble search as indicated by intervals B and C. During B and C, as in the prior art, the pager is active during a preamble search searching for a predetermined preamble.

At event D, the packet transmission begins with a preamble signal. At interval E, the preamble search results in a successful find of the preamble, wherein the pager begins to search for a sync code. Sync code is found at interval F. The slot after the sync code in batch transmission 420 has the structure information word indicated by the letter "I". The prior art pager would only search for an address, thereby not recognizing the structure information word. However, the pager of the present invention searches for the structure information word after the sync code. Upon finding the structure information word, the pager of the present invention decodes the structure information word and may use the information within to operate the battery saver for the duration of the packet.

The pager of the present invention activates only during slots indicated by the structure information word. The contents of the structure information word are shown at 435. The structure information word has 4 structure information bits along with a continue bit corresponding to the structure of up to 48 slots or three batches. The first line of 435 having 16 structure information bits corresponding to the pager battery saver and activation operations during the first batch which has 16 slots of the packet. The leading four one's indicate that the pager should be active during the first four slots of the batch. This is indicated by intervals G and H of line 430. The subsequent three zeroes in the first line of 435 indicate that battery saving should be performed for the three subsequent slots of the batch indicated by interval I of line 430. The next two one's on the first line of 435 indicates that the pager should be activated during the next two slots of the batch which is indicated by interval J. The following five zeroes on the first line of 435 indicates that battery saving should be performed during the next five slots as indicated by interval K1. The following one on the first line of 435 indicates the pager should be activated during the next slot as indicated by interval K2. The last zero on the first line of 435 indicates that battery saving should be performed during the last slot in the batch as indicated by interval K3. Note that in FIG. 9 the pager is active during the transmission of addresses within the packet and the pager is battery saving where addresses are not transmitted within the packet. Further note that the battery saving interval K1 is longer than the message occurring during interval K1. Thus, the pager of the present invention may reliably battery save for intervals longer than the interval of data associated with an address.

After completion of the first batch, the structure information word is scanned. In this case, there are no subsequent receiver activations during the possible remainder of the packet. The pager activates and searches for a subsequent sync code as indicated by interval L. A pager not finding sync code at interval L reverts back to a preamble battery saver mode operation.

Figures 10, 11, 12:
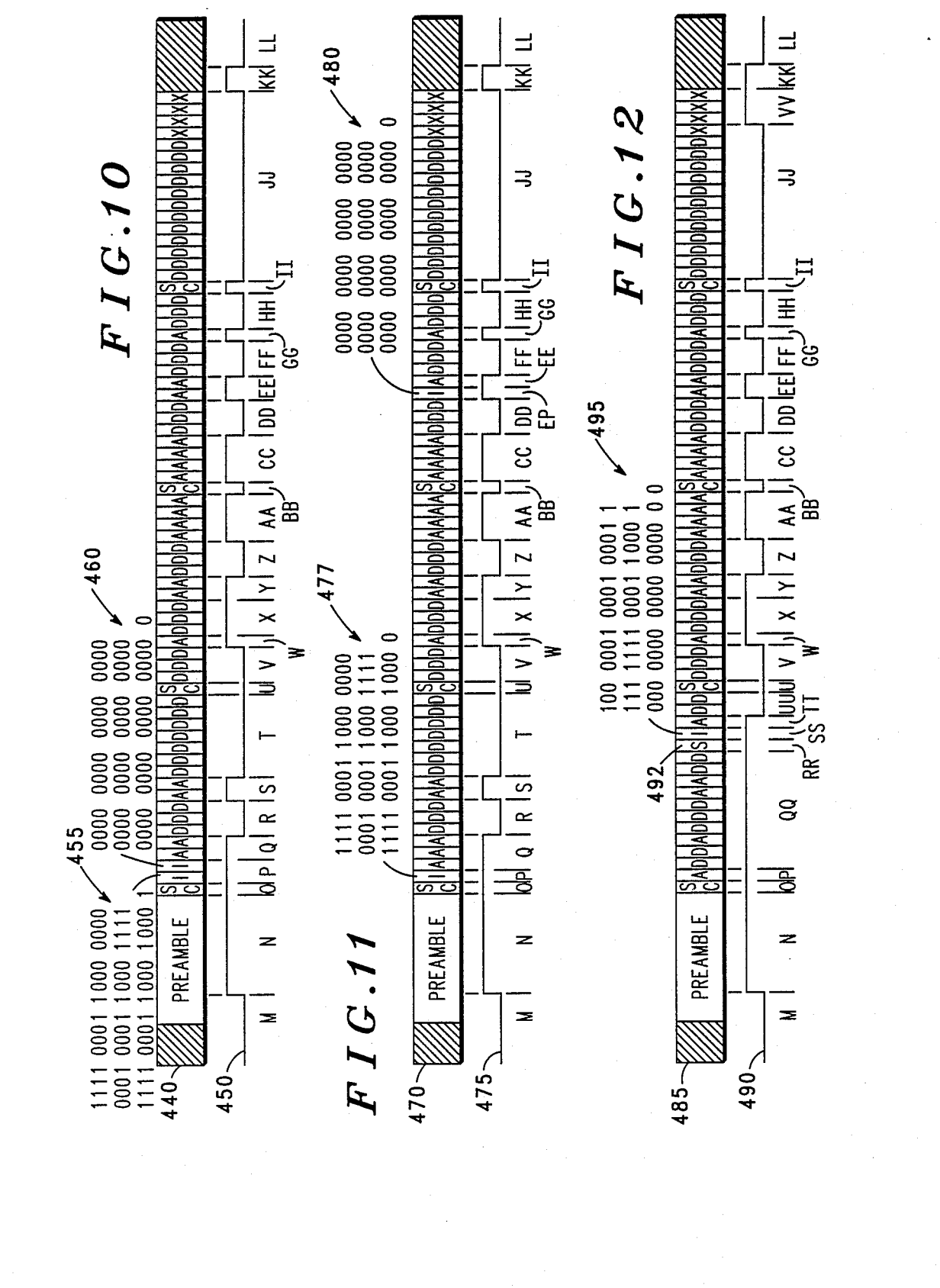

FIG. 10 shows the pager of the present invention battery saver operation in a packet having four batches of information. The packet protocol of FIG. 10 corresponds to a protocol generated by a base station operating in accordance with the flow chart of FIG. 6. Line 440 shows the signal being transmitted by the paging base station and received by a selective call receiver. Line 450 is the operation of pagers of the present invention during the reception of the packet 440. During interval M, the pager is in a preamble search mode as described in FIGS. 3 and 9. During interval N, the pager has found the preamble signal and begin a sync code search. The sync code is found at interval 0.

The pager then begins a search for the structure information word during event P. A first structure information word contents illustrated by 455 is found in the first slot of the packet. The last bit of structure information word 455 is a 1 indicating that the information is continued in the second slot. The pager examines the subsequent slot and finds a second structure information word 460 having additional packet structure information. The last bit or continue bit of 460 is clear indicating that the entire packet information is complete. The pager uses the packet structure information in 455 and 460 to operate the battery saver during the duration of the packet.

The two structure information words are received at interval P. Similar to the structure information word 435 of FIG. 9, structure information word 455 has three lines of 16 bits of structure information, each line of 16 bits of information indicating the battery saver operation during a batch. The first line of 455 has four 1's indicating that the pager is to be activate during the first four slots of the first batch. This corresponds to events P and Q. The subsequent three zeroes of the first line of 455 indicate that battery saving should be performed during the next three slots as indicated by interval R. The next two 1's of the first line of 455 indicate the pager receiver should be active during the next two slots of the first batch as indicated by area S of line 450. The subsequent seven zeroes of the first line of 455 indicate that battery saving should be performed during the last seven slots of the first batch of the packet as indicated by interval T of line 450.

At interval U, the remaining information bits of 455 and 460 are examined, finding that subsequent pager activations are to be performed during the packet, and the pager battery saves through the sync code word U.

The second line of 455 indicates the battery saver operation during the second batch of the packet. The first three bits of the second line indicate the pager should be battery saving during the first three slots of the second packet as indicated by interval V of line 450. The next bit indicates that the pager should be active during the fourth slot of the second batch as indicated by interval W, line 450. The next three zeroes of the second line of 455 indicate that the pager should battery save during the next three slots of the packet. However, during interval W, a pager's own address is decoded. Upon decoding the address, the pager remains active to decode the subsequent data associated with the message. This is illustrated by interval X of line 450. The next two bits of the second line of 455 indicate that the receiver should be activated and decoding the information during the next two slots of the packet. This is indicated by interval Y. The pager already active during interval X remains active during interval Y. The next three bits of the second line of 455 indicate that the pager should battery save during the next three slots of the packet as indicated by interval Z of line 450. The last four bits of the second line of 455 indicate that the pager should be active during this interval as indicated by interval AA of line 450.

Upon the third batch, the balance of the bits in structure information words 455 and 450 are scanned. Finding that subsequent pager activations are required, battery saving is performed during the sync code as indicated by interval BB. The third line of 455 indicates the structure during the third batch of packet. The first four bits indicate that the pager should be active during the first four slots of the third packet as indicated by interval CC. The next three bits indicate that the pager should battery save during the next three slots of the packet which is indicated by interval DD of line 450. The next two bits of the third line of 455 indicate that the pager should be active during the next two slots of the third packet as indicated by interval EE of line 450. The next three bits indicate the pager should battery save during the next three slots of the third packet as indicated by interval FF of line 450. The next bit indicates the receiver should be active during the next slot as indicated by area GG of line 450. The last three bits of the third line of 455 indicate the pager should battery save during the last three slots of the third packet as indicated by interval HH of line 450.

The fourth packet begins with a sync code that occurs during interval II. The balance of the structure information bits all included within 460 are scanned.

Upon finding that no subsequent pager activations are to be performed, the pager attempts to decode the sync word during interval II. The pager, upon finding sync code during interval II, examines the structure information bits for the fourth packet which corresponds to the first line of 460. Finding 16 zeroes, the pager battery saves during the entire fourth batch as indicated by interval JJ, line 450. At the end of the fourth batch, the balance of the structure information bits in 460 are scanned. Since there are no subsequent receiver operation within the packet, the pager is active at interval KK and searches for a sync code. During interval KK, no sync code is found because the terminal is not transmitting indicated by the shaded portion of line 440 and the pager reverts back to a preamble search mode.

FIG. 11 corresponds to an alternate protocol generated by a base station operating in accordance with the flow chart of FIG. 7. The similar operations between FIGS. 10 and 11 are numerous. Line 470 corresponds to the information transmitted by the base station and received by the terminal and has a correspondence to line 440 of FIG. 10. Line 475 shows the battery saver operation of a pager operating in accordance with the present invention and is similar in operation to the operation of the pager in accordance with the present invention of FIG. 10, line 450 with the exception of the operations during events P, Q, EP, and EE of FIG. 11. In FIG. 10, event P has two structure information slots, and event Q has three address slots, while in FIG. 11, event P has one structure information slot, and event Q has three address slots. Note that the contents of the first structure information slot of FIG. 10 indicated by 455 is identical to the contents of structure information slot occurring in interval P of FIG. 11 indicated by 477 with the exception that the continue bit in 477 is clear while the continue bit of 455 is set. The pager operating in accordance with the invention of FIG. 11 performs the battery saving sequence of the pager of FIG. 10 for the first three batches of the transmission. Refer to the description of FIG. 10 for the operation from events R through DD. In line 470, note that a second structure information slot is placed in interval EP of the third batch of the packet. This corresponds to a slot which was reserved towards the end of a partial packet for a subsequent structure information slot in step 350 of FIG. 7. The structure information slot 480 is identical to the second structure information slot of FIG. 10 indicated by 460, a second difference being that interval EE of FIG. 11 shows a single address while interval EE of FIG. 10 shows two address slots. Since the corresponding bit for structure information slot 480 is set within structure information slot 477, the pager decodes the data within this structure information slot and appends the data to the data decoded in the first structure information 477. The technique shown in FIG. 11 and outlined in FIG. 7 allows structure information slots to be distributed throughout the packet which reduces the requirement for buffering messages within the paging terminal. Aside from the differences outlined herein, the operation of the pager in FIG. 11 is identical to the operation of the pager outlined on line 450 in FIG. 10.

FIG. 12 corresponds to a second alternate protocol generated by a paging terminal operating in accordance with the flow chart of FIG. 8. FIG. 12 shows the operation of a pager of the present invention's battery saver when receiving a four-batch packet wherein the structure information may be transmitted anywhere within the packet.

In FIG. 12, line 485 shows the signal transmitted by the paging terminal and received by the pager operating in accordance with the flow chart of FIG. 8. The similarities between the transmission 485 of FIG. 12 are numerous with the transmission of 440 of FIG. 10. Line 490 of FIG. 12 shows a pager of present invention's battery saver operation during the transmission. During interval M, the pager performs a preamble search, finds preamble during interval N, and finds a sync code during interval 0. During interval P, a structure information word is not found, rather a pager address is found within the slot. Consequently, subsequent battery saving in the packet is not possible as illustrated by interval QQ until a structure information address is found in interval RR. The structure information address is indicated on line 485 by the letter S within the box during interval RR. Immediately following the structure information address is a structure information data slot as indicated during interval SS. The contents of the structure information block is detailed by the data within 495. The structure information begins immediately after the completion of the structure information address and data slot. Being that the first bit of the structure information slot is set, the receiver is active for the first slot after the structure information message as indicated by event TT. The next two bits of the structure information slot 495 are clear and consequently, the pager performs battery saving during interval UU. The subsequent events U through JJ are substantially the same as the events U through JJ of FIG. 10, the difference being the structure information is within one slot 495 in FIG. 12 while the corresponding structure information of FIG. 10 is within two structure information slots as indicated by 455 and 460. Note that interval JJ of FIG. 12 is shorter than interval JJ of FIG. 10. This is because the structure information slot 495 of FIG. 12 includes enough information to perform battery saving for only a range of 48 slots of a packet. The 48 slots end at interval JJ and consequently, during interval VV, no structure information is available and the pager is active and performing the prior art operation of searching for an address in every slot during this interval. During event KK, the pager searches for the sync code. No sync code is being transmitted, as indicated by the shaded area of line 485. Consequently, the pager reverts to a preamble search mode as indicated by interval LL.

To briefly summarize, FIG. 10 shows an embodiment of the present invention wherein the structure information is within a predetermined location being the first slots of a batch. FIG. 11 shows a packet wherein structure information begins in a predetermined location being the first slot of the packet and may be distributed through subsequent slots within the packet. The location of the subsequent structure information slots is included within the previous structure information slot and the slot has a data structure word as opposed to an address structure word. FIG. 12 shows a packet where the structure information is not required to be placed within the first slot of the packet In this figure, the structure information may be placed anywhere within the packet and is preceded by a predetermined structure information address.

FIGS. 13A-D show a flow chart detailing the battery save operation of a program operating within a pager operating in accordance with the present invention. The flow chart details the steps necessary to perform the battery saving function of the present invention illustrated by line 430 of FIG. 9, line 450 of FIG. 10, line 475 of FIG. 11, and line 490 of FIG. 12.

Figure 4:
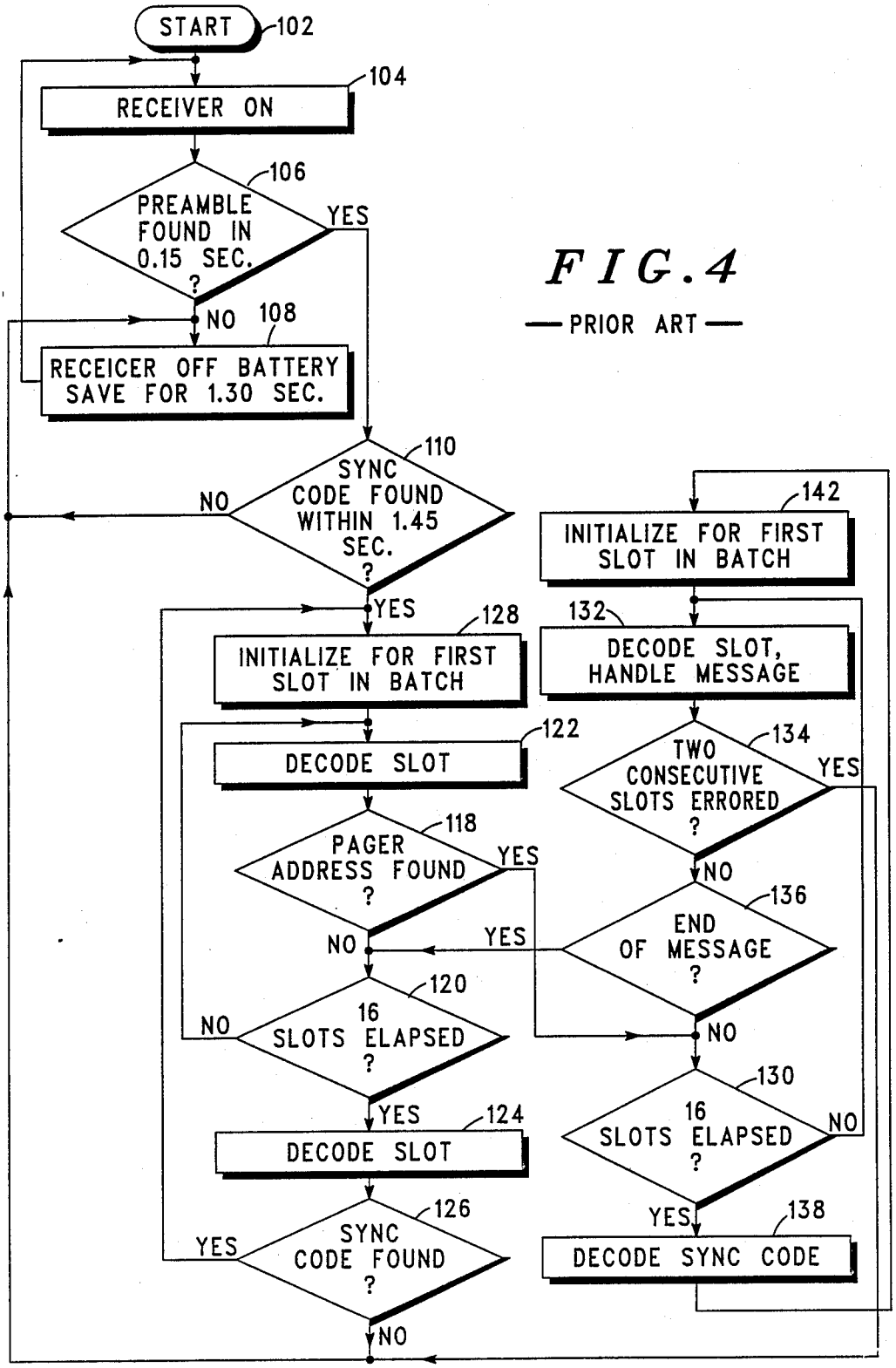
FIG. 4 shows a flow chart for prior art battery saver operation.
Figure 13A:
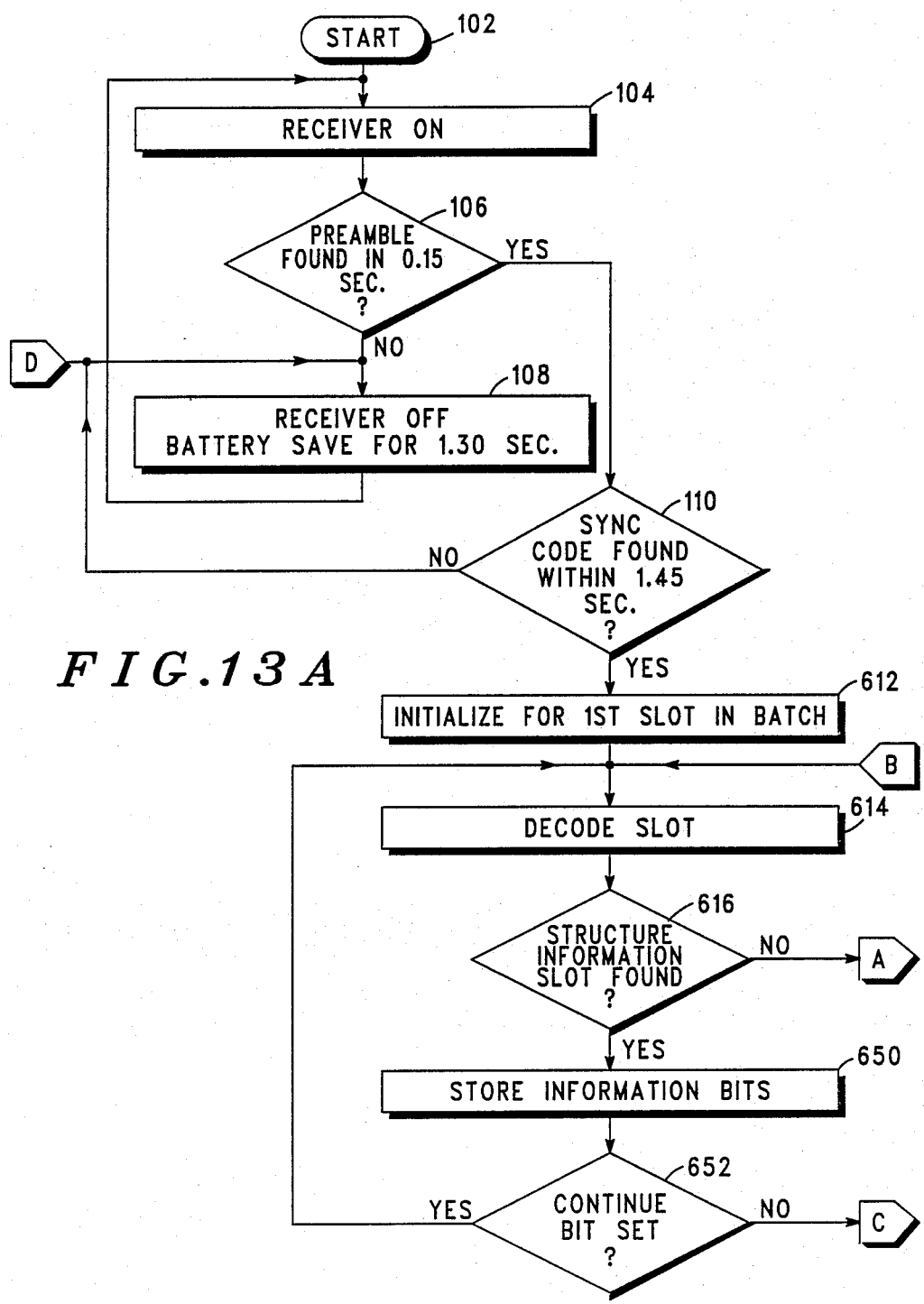
FIGS. 13A-D are flow charts showing battery saver operation in accordance with the present invention.
Figure 13B:
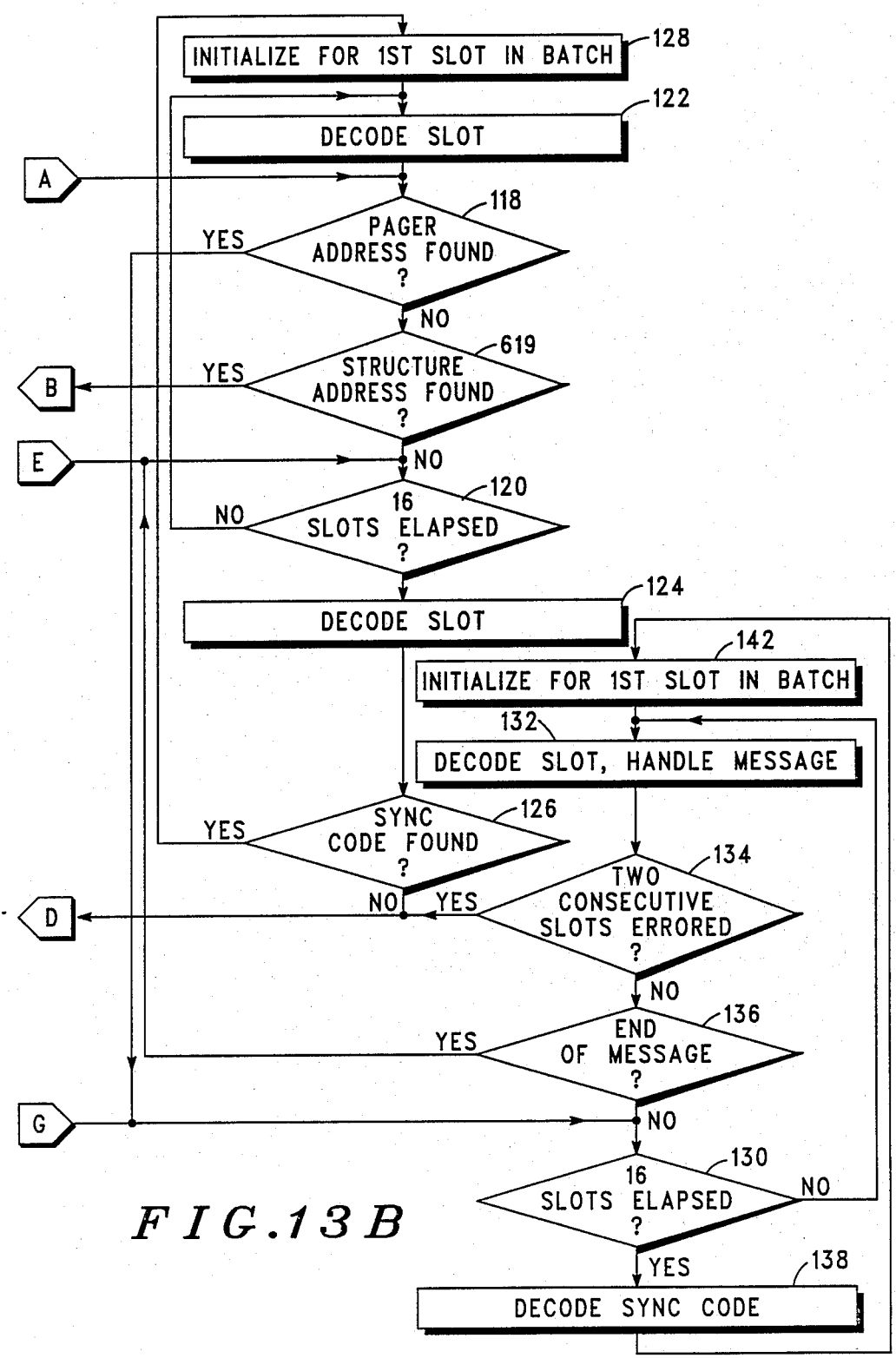

Steps 102 through 110 of FIG. 13A are equivalent to steps 102 through 120 of FIG. 5 and show the sequence from the start of the program to finding a sync code. Refer to the FIG. 4 description for the details of these steps. Referring to FIG. 13A, if in step 110 a sync code is found, the program proceeds to step 612 to initialize for the first slot in a batch. The slot is then decoded in step 614. The program checks if the decoded slot is a structure information slot at step 616. If the decoded slot is not an information slot, then the base station may not be transmitting packet structure information as described by the present invention and therefore may be transmitting a prior art format. In this case, the program proceeds to step 118 of FIG. 13B through connector "A" to a prior art decoding technique. The subsequent steps 118-142 of FIG. 13B are identical to the corresponding steps 118-142 of FIG. 4 with an exception. Refer to FIG. 4 for a detailed description of these steps, the exception being the addition of step 619 which, after step 118 if the pager's an address is not found, step 619 checks for a structure address to be found. If a structure address is not found, the program proceeds to step 120. If, however, in step 619 a structure is found, the program returns to step 614 of FIG. 13A through connector "B" to check for the next slot, and then in step 616, checks if a structure information slot has been found. The operation of step 619 corresponds to a pager operating in the mode of FIG. 12.

Referring back to FIG. 13A, if in step 616 a structure information slot was found, the program proceeds to store the structure information bits for battery saving use during reception of the batch, step 650. The program then proceeds to step 652 to check if the continue bit in the structure information word is set. If set, the program returns to step 614 to decode a subsequent information slot and append the structure information to the structure information found in the previous slot. This operation corresponds to the operation of FIG. 10.

Figure 13C:
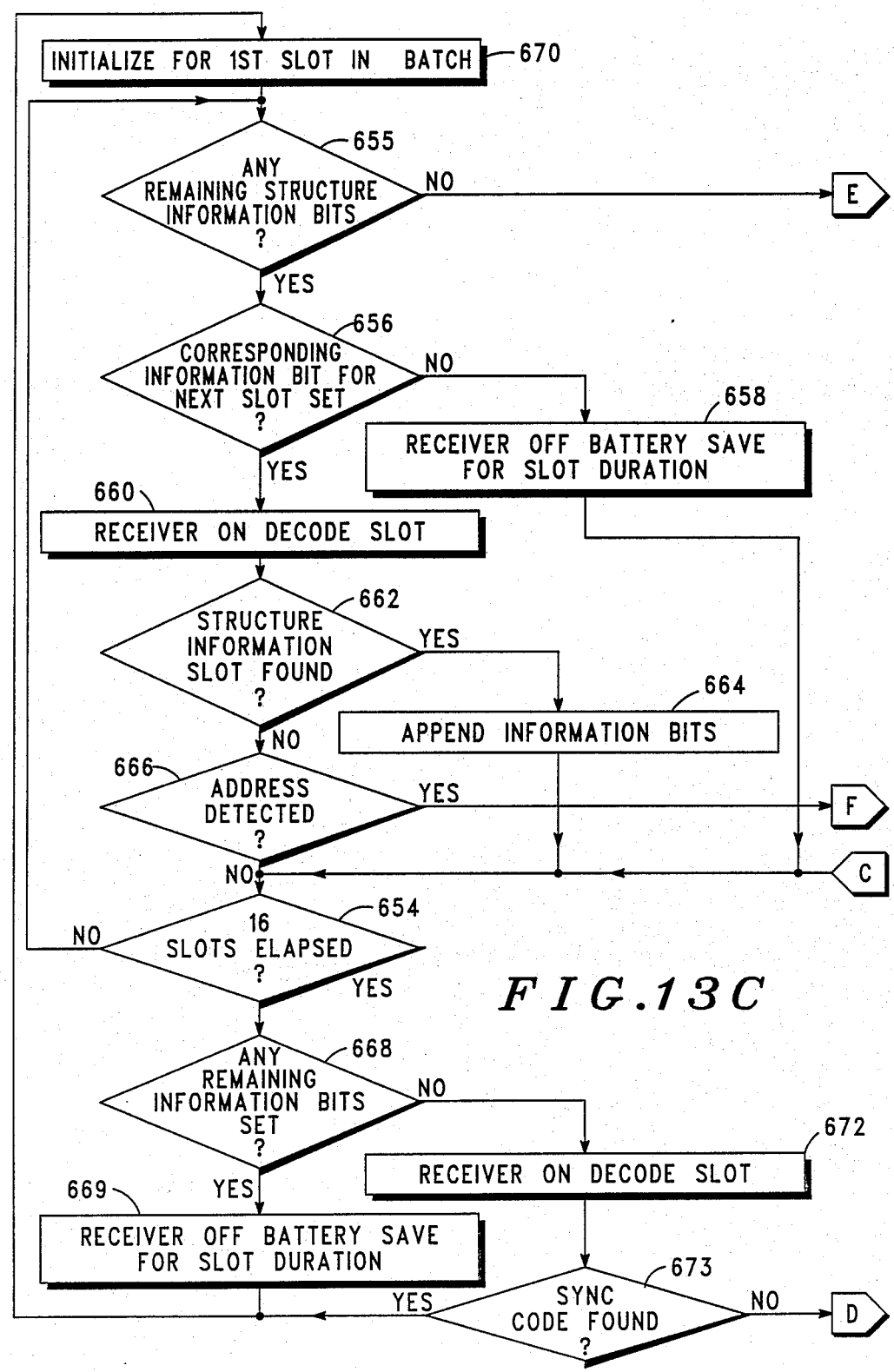
Figure 13D:
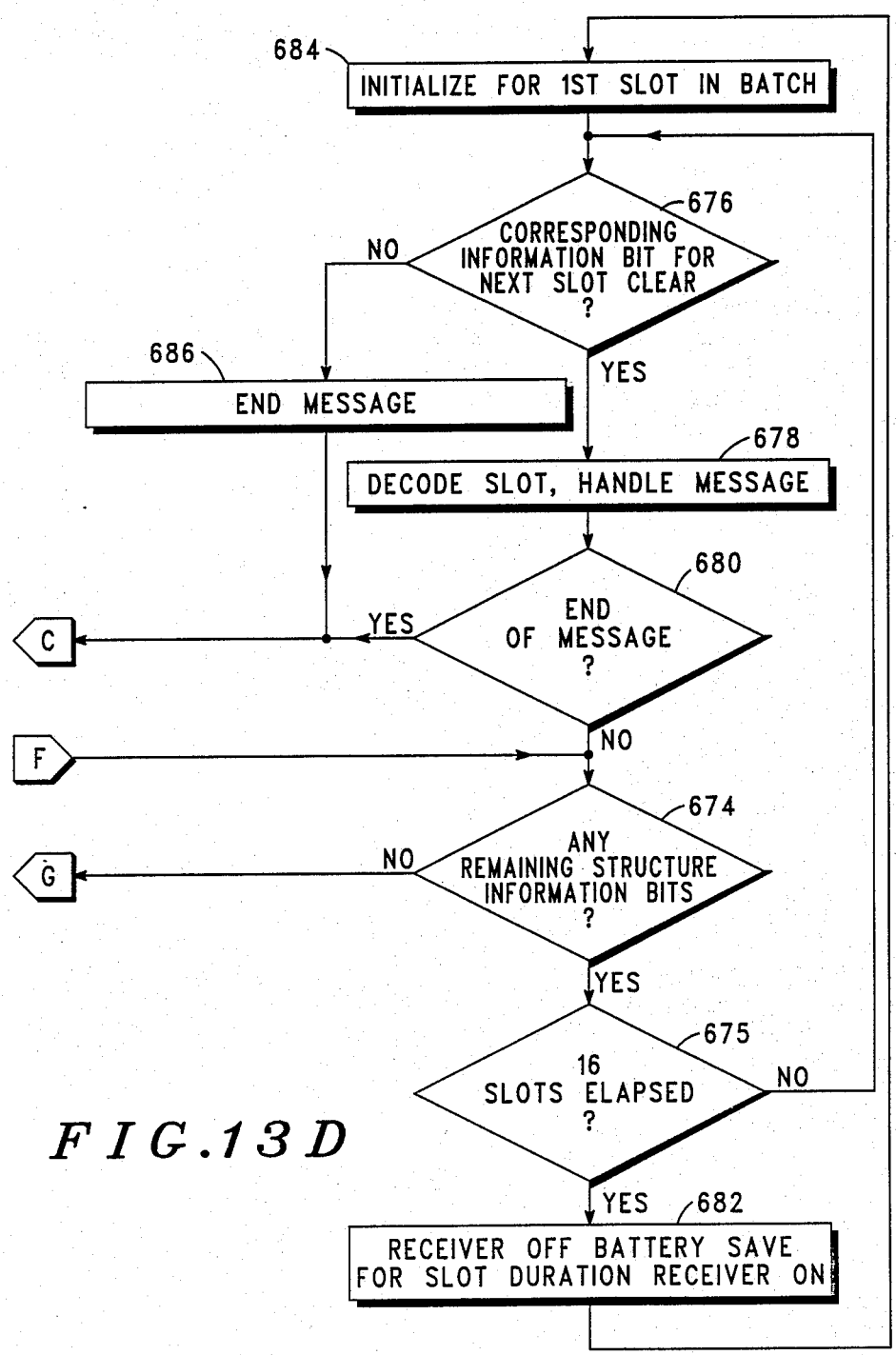

When in step 652 the continue bit is clear, the program proceeds to step through continuation to step 654 of FIG. 13C through connector "C" to check if 16 slots have elapsed. If in step 654 16 slots have not elapsed, the remaining structure bits are checked in step 655. Since it is possible for a batch transmission to continue beyond the range of received structure information, the program returns to prior art decoding step 120 of FIG. 13B through connector "E" if no structure information bits remain. If structure bits remain, the structure information bit corresponding to the next slot is checked in step 656. If the information bit is cleared, the program proceeds to step 658 to turn the receiver off and battery save for the duration of the next slot. The program then returns to step 654 to check if 16 slots have elapsed. If in step 656 the corresponding information bit is set, the program proceeds to step 660 to turn the receiver on and decode the slot. The program proceeds to step 662 to check if an additional structure information word was found. If in step 662 the information word was found, the program proceeds to step 664 to append the structure information in the slot to the information stored in step 650 or a prior execution of step 664. This operation corresponds to the operation shown in FIG. 11. The program then returns to step 654 to check if 16 slots have elapsed. If an information slot was not found in step 662, the program proceeds to step 666 to check if the pager's address was detected. If the pager's address was not detected, the program returns to step 654 to check if 16 slots have elapsed.

If in step 654 16 slots have elapsed, the program proceeds to step 668 to check if any remaining structure information bits are set, the structure information bits being decoded in steps 650 or 666. If remaining structure information bits are set, the pager proceeds to step 669 to turn the receiver off and battery save for the slot duration. The program then proceeds to step 670 to initialize for the first slot in the batch and returns to execute step 655. If in step 668 all remaining structure information bits were clear, the program proceeds to step 672 to turn the receiver on and decode the slot. If no sync code was found in step 673, the packet has been terminated and the program returns to step 108 of FIG. 13A through connector "" to begin the preamble search routine. If in step 673 a sync code was found, the program proceeds to step 670 to initialize for the first slot in a batch and then to return to step 655.

Referring back to step 666, if the pager's address was detected as in step 666, the pager checks if the address is a tone only or numeric or alphanumeric address. If the address is a tone only address, then the pager proceeds to alert the address in a manner well known to those familiar with the art and proceeds to step 654 to check if 16 slots have elapsed. If in step 666 an address was detected and if the address was a numeric or alphanumeric, the program proceeds to step 674 of FIG. 13D through connector "F" to check if any structure information bits remain. If no structure information bits remain, the program returns to a prior art message decoding technique at step 130 of FIG. 13B through connector "G" to check if 16 slots have elapsed. Otherwise, the program proceeds, in accordance with the present invention, to step 675 to check if 16 slots have elapsed. If 16 slots have not elapsed, the program proceeds to step 676 to check if the corresponding slot information bit is clear. If the information bit is clear, the program proceeds to step 678 to decode the slot and handle the message. The program then proceeds to step 680 to check if the end-of-message character was received. If the end-of-message character was received, the program returns to step 654 of FIG. 13C through connector "C" to check if 16 slots have elapsed. If in step 675 16 slots have elapsed, the program proceeds to step 682 to turn the receiver off and battery save for the slot duration. The receiver is then turned back on and the program proceeds to step 684 to initialize for the first slot in the batch. The program then returns to step 676. If in step 676 the corresponding slot information the bit is set, the message is to be ended and the program proceeds to step 686 to terminate the reception of the message and then return to step 645 of FIG. 13C through connector "C" to check if 16 slots have elapsed.

In addition to the gain in battery saving when comparing prior art battery saver to the battery saver starting in step 654 through step 673 during the decoding of addresses, note that in step 682, while decoding a message, the receiver always battery saves for a sync code. Also note that in the prior art technique of step 134, a message would be terminated by having two consecutive slots in error. This is a likely probability when considering that an errored slot may indeed have an end-of-message character and the pager would have to terminate reception of the message based on two slots in error. However, step 676 checks if a corresponding information bit for the slot is cleared. If the bit is cleared, it is possible that the slot having the end-ofmessage was in error and the message is terminated upon encountering a structure information bit indicating the next slot has an address or group information. The improved technique using the information bit and the decision in step 676 allows more than two consecutive slots to be in error while still maintaining the reception of subsequent slots which may indeed be correct. This would result in an overall improvement in sensitivity of long messages. When a message is transmitted a number of times and each retransmission allows the combination of good data with error data, overall sensitivity is improved. Such a technique is fully described in U.S. Pat. Application Ser. No. 07/000,927 to DeLuca et al. entitled "Multiple Page Error Correction" which is hereby incorporated by reference and is assigned to the assignee of the present invention.

Also note that the appending of subsequent information slots as described in step 664 allows the pager terminal to partially configure a packet upon transmission and to send information as to the packet structure as the packet is transmitted.

Additionally, the present invention allows battery saving during the sync code under certain conditions during an address search as in steps 668 through 673. This reduces the possibility of the pager falsely detecting the end of the packet.

Additionally, the present invention may be applied to other signalling systems such as the POCSAG signalling system without departing from the scope of this invention. In the case of POCSAG systems, the principle of operation varies only in location of information within the packet. Instead of a pager searching in every slot for address and structure information within a batch as in GSC, a POCSAG pager is restricted to search in a predetermined frame of only two of sixteen slots. For the POCSAG system, structure information found within a frame may apply to the battery saving operation of pagers within that frame. Subsequent operations of the invention on the POCSAG system have been described in light of the GSC system.

Additionally, although the invention has been described in view of an alphanumeric implementation of the GSC system, the principles herein may be applied to existing voice signalling system aspects and many other aspects of GSC. The operation of the GSC system has been described in detail in U.S. Pat. Pat. No. 4,424,514 to Fennell et al. entitled "Decoder for Transmitted Message Activation Code" and U.S. Pat. No. 4,427,980 to Fennell et al. entitled "Encoder for Transmitted Message Activation Code". U.S. Pat. No. 4,518,961 to Davis et al. entitled "Universal Paging Device with Power Conservation" also describes the operation of the POCSAG system. These references are hereby incorporated by reference. It should be further appreciated that the scope of this invention is not limited to either the GSC or POCSAG system and may be applied to a variety of signalling systems.

It can be further appreciated that other embodiments of the present invention may be realized without departing from the spirit and scope of the claimed invention.

What is claimed is:

1. A method for sending an information packet having at least one portion, a packet structure field and an at least one message having an address and information associated with the address, the packet structure field having an identifying means for identifying the occurrence of the at least one address within the information packet, said method comprising the steps of:

(a) accumulating at least one message for selective call receivers and locating the message accumulation within the portion of the information packet;
(b) positioning the packet structure field within the portion of the information packet;
(c) determining the location of addresses within the portion of information packet;
(d) generating the identifying means in correspondence to the determination of step (c)
(e) incorporating the identifying means within the positioning of the packet structure field; and
(f) transmitting the portion of the information packet.

2. The method of claim 1 further wherein step (f) of transmitting includes transmitting a preamble signal ahead of the first portion of the information packet.

3. The method of claim 2 further wherein the preamble signal is unique to a particular group within said plurality of selective call receivers.

4. The method of claim 1 further wherein the information packet consists of only one portion.

5. The method of claim 4 further wherein step (b) of positioning includes positioning the packet structure field at a predetermined location within the information packet.

6. The method of claim 5 further wherein the predetermined position of the packet structure field within the information packet occurs prior to the location of the message accumulation.

7. The method of claim 1 wherein the packet structure field includes a plurality of packet structure elements and the step of positioning further comprises:

(g) reserving a position for a first packet structure element prior to the location of the message accumulation;
(h) incorporating a packet structure element in the position reserved for the packet structure element;
(i) reserving a position for a subsequent packet structure element within the message accumulation if a subsequent portion of the information packet is to be transmitted; and wherein step (d) of generating additionally identifies the position of the subsequent packet structure element; and further comprising the step of:
(j) repeating steps (a) through (i) until no portion of the information packet remains.

8. The method of claim 7 further wherein the step (i) of reserving reserves a position at the end of the message accumulation.

9. The method of claim 7 further wherein the step (f) of transmitting is performed concurrently with the subsequent performance of steps (a) through (j).

10. The method of claim 1 further wherein the identifying means of step (d) comprises an indicating means for indicating the beginning of the packet structure field and is followed by an at least one packet structure element.

11. The method of claim 10 wherein the indicating means is a predetermined address.

12. The method of claim 10 wherein step (a) of accumulating further comprises:

(k) transmitting the accumulation if packet structure field is not to be included with the portion of the information packet;
(l) terminating the transmission if no portion of the information packet remains and steps (a) through (j) have been executed at least once;

(m) repeating steps (a) through (1) until the packet structure field is to be transmitted with the accumulation; and (n) repeating steps (a) through (m) until no portion of the information packet remains.

13. The method of claim 12 further wherein step (f) of transmitting is performed concurrently with the subsequent performance of steps (a) through (n).

14. The method of claim 1 wherein step (f) of transmitting further includes inserting a periodic predetermined code within the portion of the information packet.

15. The method described in claim 14 wherein the portion of the information packet has an integer number of slots of constant duration wherein each message and packet structure field comprise an integer number of slots and wherein the message address occupies a single slot and message information occupies an integer number of slots; and wherein the periodic predetermined code has a duration of an integer number of slots.

16. The method of claim 15 wherein the periodic predetermined code has a duration of one slot and is inserted in the first slot of the information and is periodically inserted every sixteen slots thereafter.

17. The method described in claim 15 wherein step (d) of generating further comprises:

(o) establishing a structure information element within the identifying means, the structure information element comprising a predetermined number of bits corresponding to a range of slots within the information packet wherein each bit has a correspondence to one slot;

(p) setting all of the bits within the structure element to a first state;

(q) setting a bit to a second state if a corresponding slot contains an address; and (r) setting a bit to the second state if a corresponding slot contains at least part of a packet structure field.

18. A method for reducing power consumption of a selective call receiver capable of operating in a low power mode and a high power mode, the selective call receiver having a unique address for identifying the selective call receiver, the selective call receiver being a member of a plurality of selective call receivers, each selective call receiver being capable of receiving an information packet having a packet structure field and an at least one message having an address and information associated with the address, the packet structure field having an identifying means for identifying the occurrence of the at least one address within the information packet, said method comprising the steps of:

(a) operating the selective call receiver in the high power mode during reception of the information packet in order to extract the packet structure field;

(b) interpreting the identifying means within the packet structure field to determine the occurrence of the at least one address within the information packet; and (c) operating the selective call receiver in the low power mode until said occurrence.

19. The method of claim 18 further comprising the step of operating the selective call receiver in the high power mode during said occurrence in order to decode the address.

20. The method of claim 19 further including the step of operating the selective call receiver in the high power mode in order to decode information associated with the decoded address if the decoded address matches the unique address.

21. The method of claim 20 wherein the packet structure information field identifying means identifies the occurrence of an at least one subsequent addresses, the method further comprising the steps of:

(d) interpreting the identifying means to determine the occurrence of the subsequent address within the information packet;

(e) operating the selective call receiver in the low power mode until the occurrence of the subsequent address;

(f) operating the selective call receiver in the high power mode in order to decode the subsequent address;

(g) operating the selective call receiver in the high power mode in order to decode information associated with the subsequent address if the subsequent address matches the unique address; and (h) repeating the steps (d) through (g) until the determination is made that the identifying means indicates the occurrence of no subsequent address.

22. The method of claim 21 wherein the information packet further has a periodic predetermined code inserted within the information packet wherein the presence of the predetermined code serves as an indication of the continuation of the information packet, said method further comprising the steps of:

(i) repeating steps (a) through (h) wherein steps (c) and (e) further include operating the receiver in the low power mode during the predetermined code; and (j) after the determination is made that the identifying means indicates the occurrence of no subsequent address operating the receiver in the high power mode during the predetermined code in order to detect the predetermined code.

23. The method of claim 22 wherein the identifying means has a limited range for identifying the occurrence of addresses within the information packet and further comprising the steps of:

(k) operating the selective call receiver in the low power mode if in step (j) the predetermined code is detected;

(l) operating the selective call receiver in the high power mode during the occurrence of a subsequent predetermined code in order to detect the predetermined code if the occurrence of the predetermined code is within the range of the identifying means;

(m) repeating steps (k) and (l) for the limited range of the identifying means if the predetermined code is detected in step (l); and (n) operating the receiver in the high power mode if the limited range of the identifying means is exceeded.

24. The method of claim 23 further comprising the steps of:

(o) operating the selective call receiver in an information packet search mode prior to receiving the information packet in step (a); and (p) returning the operation the selective call receiver to the information packet search mode if the predetermined code is not detected in either of steps (j), (l), or (n).

25. The method of claim 23 further wherein step (n) of operating further includes the step of decoding the information packet in order to detect the occurrence of the unique address.

26. The method of claim 18 further wherein the packet structure field comprises an indicating means for indicating the beginning of the packet structure field and step (a) further includes operating the selective call receiver in a high power mode in order to detect the indicating means and subsequently extract the identifying means within the packet structure field.

27. The method of claim 26 wherein the indicating means is a predetermined address.

28. The method of claim 26 further wherein step (a) of operating additionally includes the step of decoding the information packet in order to detect the occurrence of the unique address.

29. The method of claim 18 wherein the packet structure field has at least one packet structure element for embodying the indicating means and wherein step (a) of operating further comprises the step of decoding a first packet structure element in a predetermined location within the information packet.

30. The method of claim 29 further wherein the predetermined location of the first packet structure element is at the beginning of the information packet.

31. The method of claim 29 wherein the packet structure field has a plurality of elements distributed within the information packet wherein a subsequent packet structure element follows a preceding packet structure element and the identifying means of the preceding packet structure element further identifies the occurrence of the subsequent packet structure element, the method including the step of operating the receiver in the high power mode during the occurrence of the subsequent packet structure element in order to decode the subsequent packet structure element and appending the identifying means within the subsequent packet structure element to identifying means within the previous packet structure element.

32. The method of claim 31 wherein the identifying means within each packet structure element has a limited range and wherein the subsequent packet structure element occurs within the range of the indicating means within the preceding packet structure element.

33. The method of claim 31 wherein the subsequent packet structure element immediately follows a preceding packet structure element.

34. A method for operating a communication system for producing an information packet having at least a first portion and having a packet structure field and at least one message having an address and information associated with the address, the packet structure field having an identifying means for identifying the occurrence of the at least one address within a range of the information packet, and said method further being for reducing power consumption of a selective call receiver capable of operating in a low power mode and a high power mode, the selective call receiver having a unique address for identifying the selective call receiver, the selective call receiver being a member of a plurality of selective call receivers, each selective call receiver being capable of receiving the information packet, said method comprising the steps of:

(a) accumulating at least one message for the plurality of selective call receivers and locating the message accumulation within the portion of the information packet;

(b) positioning the packet structure field within the portion of the information packet;

(c) determining the location of addresses within the portion of information packet;

(d) generating the identifying means in correspondence to the determination of step (c);

(e) incorporating the identifying means within the positioning of the packet structure field;

(f) transmitting the portion of the information packet;

(g) operating the selective call receiver in the high power mode during reception of the information packet in order to extract the packet structure field;

(h) interpreting the identifying means within the packet structure field to determine the occurrence of the address within the information packet;

(i) operating the selective call receiver in the low power mode until the occurrence of the address; and (j) operating the selective call receiver in the high power mode in order to decode the address.

35. A method for receiving a message within an information packet comprising a packet structure field, said message and a subsequent message, said message having an address and information associated with said address, the subsequent message having a subsequent address, the packet structure field having an identifying means for identifying the occurrence of said address and the subsequent address within the information packet, said message being capable of being interrupted by noise, said information packet and noise interruption being received by a selective call receiver having a unique address for identifying the selective call receiver, said method comprising the steps of:

(a) receiving the information packet in order to extract the packet structure field;

(b) interpreting the identifying means within the packet structure field to determine the occurrence of said address and the subsequent address within the information packet;

(c) receiving and decoding said address of said message during the occurrence of said address;

(d) decoding the information associated with said address and noise interruptions until the occurrence of the subsequent address; and (e) forming a message from the decoded address, information and noise interruptions.

36. A selective call receiver having a unique address and being capable of receiving a modulated information packet having a packet structure field and at least one message having an address and information associated with the address, the packet structure field having an identifying means for identifying the occurrence of the at least one address within the information packet comprising:

a receiving means capable of being operated in a high power mode in order to receive and demodulate the information packet and otherwise being capable of operating in a lower power mode;

a decoding means coupled to the receiving means and capable of operating in a high power mode in order to decode the demodulated information packet and extract the packet structure field, the decoding means further operating in the high power mode in order to decode the address and information associated with the address if the address matches the unique address, and the decoding means further generating an enabling signal for operating said receiving means while decoding;

an analyzing means coupled to the decoding means and responsive to the decoded packet structure field, the analyzing means being capable of analyzing the identifying means and generating a timing signal indicative of the occurrence of the at least one address within the information packet; and wherein the receiving means operates in the high power mode in response to the generation of the timing signal, the receiving means additionally operating in the high power mode in response to the generation of the enabling signal, and the receiving means operates in the low power mode when the timing signal and the enabling signal are not generated.

37. The selective call receiver of claim 36 wherein the decoding means is further capable of operating in the low power mode when the timing signal and the enabling signal are not generated.

38. A communication system capable of transmitting and receiving a signal representing a formed information packet which has located therein a message field and a packet structure field the message filed including an address and information associated with the address, the packet structure field including an identifying signal for identifying the location of the address within the information packet, said communication system comprising:

a base station means including a terminal means for forming the information packet, wherein the terminal means locates the message field and the packet structure field within the information packet, said base station means further including a packet structure encoder means coupled to the terminal means for generating the identifying signal, wherein the identifying signal is indicative of the location of the address within the information packet, the packet structure encoder means further means further for incorporating the identifying signal within the packet structure field of the formed information packet, and said base station means further including a transmitting means coupled to the terminal means for transmitting the signal representing the formed information packet; and a selective call receiving means having a unique address, the selective call receiving means including a receiver means capable of operating in a high power mode in order to receive the signal representing the information packet and otherwise being capable of being operated in a lower power mode, the selective call receiving means further including a decoding means coupled to the receiver means and being capable of decoding the signal representing the information packet and extracting the packet structure field, the decoding means further being capable of decoding the address and decoding the information associated with the address if the address matches the unique address, the decoding means further generating an enabling signal for operating the receiver means while decoding, and the selective call receiving means further including an analyzing means coupled to the decoding means and responsive to the decoded packet structure field for analyzing the identifying signal and generating a timing signal indicative of the occurrence of the address wherein the receiving means operates in a high power mode in response to the generation of timing signal, and the receiving means additionally operates in the high power mode in response to the generation of the enabling signal, and the receiving means operates in the low power mode when the timing signal and the enabling signal are not generated.

39. A base station capable of transmitting a signal representing a formed information packet which has located therein a message field and a packet structure field, the message field including an address and information associated with the address, the packet structure field including an identifying signal for identifying the location of the address within the information packet, said base station comprising:

a terminal means for forming the information packet, wherein said terminal means locates the message field and the packet structure field within the information packet;

a packet structure encoder means coupled to said terminal means for generating the identifying signal, wherein the identifying signal is indicative of the location of the address within the information packet, said packet structure encoder means further for incorporating the identifying signal within the packet structure field of the formed information packet; and a transmitting means coupled to said terminal means for transmitting the signal representing the formed information packet.

* * * * *